United States Patent [19]

Pace

[11] Patent Number: 5,073,850
[45] Date of Patent: Dec. 17, 1991

[54] START CIRCUIT FOR A POWER SUPPLY CONTROL INTEGRATED CIRCUIT

[75] Inventor: Wilson D. Pace, Tempe, Ariz.

[73] Assignee: Motorola, Inc., Schaumburg, Ill.

[21] Appl. No.: 709,471

[22] Filed: Jun. 3, 1991

[51] Int. Cl.$^5$ .................... G05F 1/56; H02M 7/23
[52] U.S. Cl. ................................. 363/89; 363/49; 323/222; 323/901
[58] Field of Search ............ 363/20, 21, 97, 124, 363/49; 323/222, 282, 283, 901

[56] References Cited

U.S. PATENT DOCUMENTS

| | | | |
|---|---|---|---|
| 4,471,327 | 9/1984 | Moss | 363/49 |
| 4,542,330 | 9/1985 | Terbrack | 323/222 |
| 4,716,510 | 12/1987 | Pace et al. | 323/901 |
| 4,806,842 | 2/1989 | Bittner | 323/272 |

Primary Examiner—Peter S. Wong
Attorney, Agent, or Firm—Bradley J. Botsch

[57] ABSTRACT

A power supply control integrated circuit includes an internal start circuit. The start circuit monitors the time that an output of a latch is in a first logic state such that after a predetermined length of time has elapsed the start circuit forces a second logic state to occur at the output of the latch.

8 Claims, 1 Drawing Sheet

START CIRCUIT FOR A POWER SUPPLY CONTROL INTEGRATED CIRCUIT

BACKGROUND OF THE INVENTION

This invention relates to circuits, for example, a start circuit for a self-oscillating power supply control integrated circuit.

One application for a self-oscillating power supply control circuit is in a boost converter application wherein an input AC signal is converted to an output DC voltage. Further, it is well known that to initiate the operation of the power supply control integrated circuit (IC), a start circuit is required.

Most, if not all, self-oscillating start circuits for power supply control integrated circuits are external and utilize an external free running oscillator signal that is summed with a current detect signal at one input of the power supply control integrated circuit to initiate power supply operation. However, this approach requires that an input to the current detect comparator of the power supply control integrated circuit must be properly weighted such that the start signal from the external oscillator does not interfere with normal operation. These start circuits are only utilized to initiate the power supply operation and do not monitor the output off time of the power supply upon initiation. Further, external oscillators require additional components which increase the cost of the power supply.

Hence, there exists a need to provide an improved start circuit for a power supply control integrated circuit that monitors the output off time of the power supply, while not requiring additional external components.

SUMMARY OF THE INVENTION

Briefly, there is provided a power supply control integrated circuit comprising a first comparator having first and second inputs and an output, the first input being coupled to receive a first voltage signal, the second input being coupled to receive a first reference voltage; a second comparator having first and second inputs and an output, the first input of the second comparator being coupled to receive a second voltage signal, the second input of the second comparator being coupled to receive a second reference voltage; a flip-flop circuit having a plurality of inputs and an output, a portion of the plurality of inputs of the flip-flop circuit being responsive to the outputs of the first and second comparators, the output of the flip-flop circuit providing an output signal of the power supply control integrated circuit; and a timer circuit having an input and an output, the input of the timer circuit being coupled to the output of the flip-flop circuit, the output of the timer circuit being coupled to one of the plurality of inputs of the flip-flop circuit, the timer circuit applying a first logic state to the one of the plurality of inputs of the flip-flop circuit when the output of the flip-flop circuit has been in a second logic state for a predetermined length of time.

The present invention will be better understood from the following detailed description taken in conjunction with the accompanying drawings.

DETAILED DESCRIPTION OF THE DRAWINGS

Figure 1:
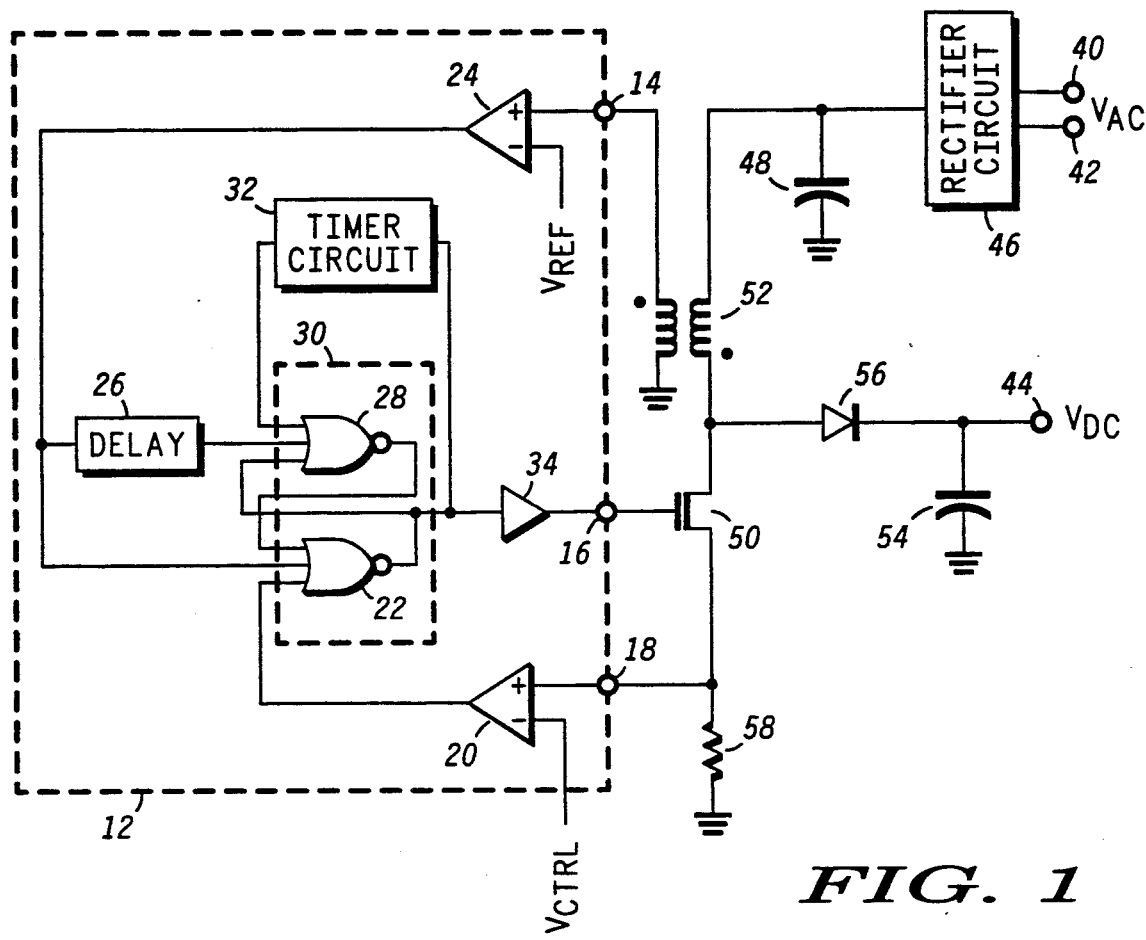
FIG. 1 is a partial schematic/block diagram illustrating a boost converter circuit including a power supply control integrated circuit in accordance with the present invention.

Referring to FIG. 1, a partial schematic/block diagram illustrating power supply control integrated circuit 12 in conjunction with external circuitry to form a boost converter circuit is shown. Power supply supply control integrated circuit 12 is responsive external control voltage $V_{CTRL}$ and is coupled to the external circuitry via external pins 14, 16 and 18.

Power supply control integrated circuit 12 includes pulse width modulator comparator 20 having an inverting input coupled to receive control voltage $V_{CTRL}$ and a non-inverting input coupled to external pin 18. The output of comparator 20 is coupled to a first input of NOR gate 22.

Current detect comparator 24 has an inverting input coupled to receive reference voltage $V_{REF}$ and a non-inverting input coupled to external pin 14. The output of comparator 24 is coupled to an input of delay circuit 26 and to a second input of NOR gate 22.

The output of delay circuit 26 is coupled to a first input of NOR gate 28, the latter having an output coupled to a third input of NOR gate 22. Similarly, the output of NOR gate 22 is coupled to a second input of NOR gate 28. Further, the output of NOR gate 22 also provides the output of RS flip-flop 30 which is comprised of NOR gates 22 and 28.

The output of RS flip-flop 30 is coupled to an input of timer circuit 32, the latter having an output coupled to a third input of NOR gate 28.

In addition, the output of RS flip-flop 30 is coupled to external pin 16 via driver 34.

The additional external circuitry includes rectifier circuit 46 responsive to an AC voltage applied across terminal 40 and 42 for providing a rectified AC signal at an output which is coupled to a first terminal of capacitor 48. The second terminal of capacitor 48 is returned to ground.

The output of rectifier circuit 46 is also coupled to the drain electrode of field effect transistor (FET) 50 via the primary coil of transformer 52.

The drain electrode of FET 50 is also coupled to a first terminal of capacitor 54 via diode 56. The first terminal of capacitor 54 is also coupled to terminal 44 at which output voltage $V_{DC}$ is supplied. Further, the second terminal of capacitor 54 is returned to ground.

The source electrode of FET 50 is coupled to external pin 18 and to a first terminal of resistor 58. The second terminal of resistor 58 is returned to ground. The gate electrode of FET 50 is coupled to external pin 16.

The secondary coil of transformer 52 has a first terminal coupled to external pin 14 and a second terminal returned to ground.

Briefly, the boost converter circuit of FIG. 1 converts an input AC voltage signal applied across terminals 40 and 42 to an output DC voltage signal supplied to terminal 44.

In particular, initially assume that the output of RS flip-flop 30 is a logic high voltage level thereby enabling driver 34 to turn on external FET 50. Upon turning on FET 50, current begins to flow through the primary coil of transformer 52 from the rectified AC line voltage appearing at the output of rectifier circuit 46 and, subsequently, through resistor 58.

The current through the primary coil of transformer 52 will continue to increase in magnitude until the voltage across resistor 58 rises above control voltage $V_{CTRL}$ thereby causing PWM comparator 20 to supply a logic high voltage level to the first input of NOR gate 22. A logic high voltage level occurring at the first input of NOR gate 22 resets RS flip-flop 30 thereby turning off the drive to FET 50 and rendering FET 50 non-operative.

It is worth noting that control voltage $V_{CTRL}$ may be set to be the product of the rectified AC line voltage and the output DC voltage appearing at terminal 44.

Upon turning off FET 50, the current through the primary coil of transformer 52 does not change instantaneously. Thus, the voltage on the drain of FET 50 quickly rises to a voltage substantially equal to one diode voltage drop above voltage $V_{DC}$ wherein diode 56 is forward biased to allow current to charge filter capacitor 54.

Eventually, the stored energy in transformer 52 will dissipate and the current will stop flowing through the primary coil and the voltage on the drain of FET 50 will decrease to the point where it is substantially equal the AC rectified line voltage at the output of rectifier circuit 46.

When there is substantially zero current flowing through the primary coil of transformer 52, there is also substantially zero voltage across the primary coil of transformer 52. Likewise, there will also be substantially zero voltage across the secondary coil of transformer 52. Further, when the voltage across the secondary coil of transformer 52 is equal to a predetermined voltage, for example, zero volts, the output of current detect comparator 24 switches to a logic low voltage level thereby indicating that there is zero current flowing through transformer 52.

The logic low voltage level occurring at the output of comparator 24 is applied to the second input of NOR gate 22 and to the first input of NOR gate 28 via delay circuit 26. In turn, RS flip-flop 30 provides a logic high voltage level at its output thereby forcing driver 34 to turn on external FET 50 and allow current to begin flowing through the primary coil of transformer 52, as aforedescribed.

Delay circuit 26 is utilized to control RS flip-flop 30 to set the output of RS flip-flop 30 to a logic high voltage level when the output of comparator 24 switches from a logic high voltage level to a logic low voltage level.

In particular, when the output of comparator 24 switches to a logic low voltage level, a logic low voltage level is applied to the second input of NOR gate 22. Subsequently, a delayed logic low voltage level is applied to the first input of NOR gate 28. However, before the logic low voltage level reaches the first input of NOR gate 28, the logic high voltage level that appears at the output of NOR gate 22 is applied to the second input of NOR gate 28. A logic high voltage level at the second input of NOR gate 28 provides a logic low voltage level at the output of NOR gate 28 which is applied to the third input of NOR gate 22. Therefore, assuming that the output of comparator 20 is also a logic low voltage level, the output of NOR gate 22 is a logic high voltage level as desired.

In summary, without delay circuit 26, when the output of comparator 24 switches from a logic high voltage level to a logic low voltage level, a race condition would exist between the signals occurring at the inputs of NOR gates 22 and 28 and, thus, the output of RS flip-flop 30 would be inconclusive. However, delay circuit 26 allows RS flip-flop 30 to be edge sensitive. In other words, RS flip-flop 30 in conjunction with delay circuit 26 is designed such that the output of RS flip-flop 30 switches to the proper logic state on the negative edge transition of comparator 24.

Figure 2:
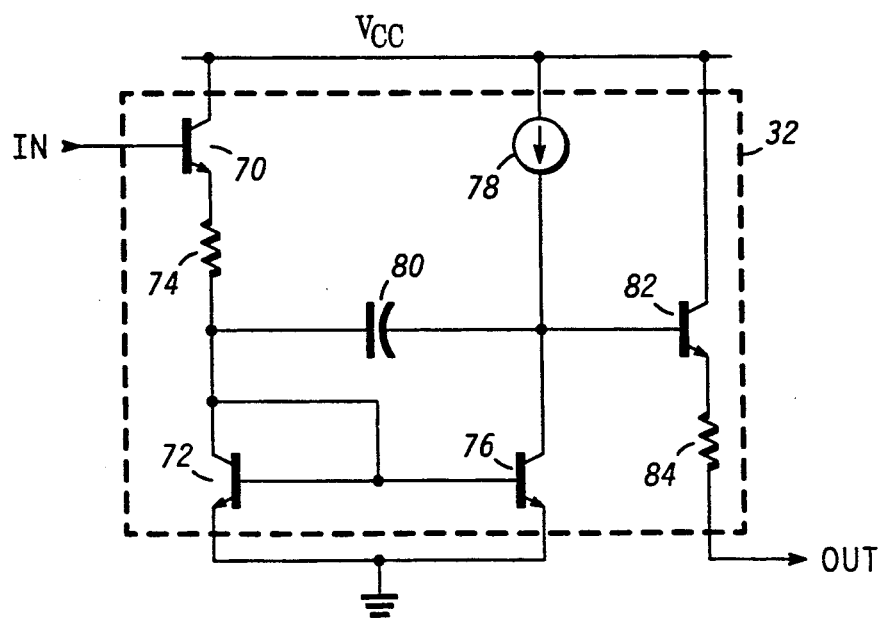
FIG. 2 is a detailed schematic diagram illustrating one implementation of the timer circuit shown in FIG. 1.

Referring to FIG. 2, a detailed schematic diagram illustrating one implementation of timer circuit 32 of FIG. 1 is shown. Timer circuit 32 includes transistor 70 having a base coupled to the input of timer circuit 32. The collector of transistor 70 is coupled to operating potential $V_{CC}$. The emitter of transistor 70 is coupled to the collector of transistor 72 via resistor 74.

The base of transistor 72 is coupled to the collector of transistor 72 and to the base of transistor 76. The emitters of transistors 72 and 76 are returned to ground. The collector of transistor 76 is coupled through current source 78 to operating potential $V_{CC}$.

Timing capacitor 80 is coupled across the collectors of transistors 72 and 76. The collector of transistor 76 is also coupled to the base of transistor 82 where the collector of transistor 82 is coupled to operating potential $V_{CC}$.

The emitter of transistor 82 is coupled to a first terminal of resistor 84 whereby the second terminal of resistor 84 is coupled to provide the output of timer circuit 32.

With reference back to FIG. 1, it is understood that the base of transistor 70 is coupled to the output of RS flip-flop 30 while the second terminal of resistor 84 is coupled to the third input of NOR gate 28.

Briefly, timer circuit 32 monitors the time that the output of RS flip-flop 30 is in a logic low state, and after a predetermined elapsed time, timer circuit 32 provides a logic high voltage level to the third input of NOR gate 28. The logic high voltage level applied to the third input of NOR gate 28 subsequently generates a logic low voltage level at the third input of NOR gate 22. Further, assuming that the first and second input of NOR gate 22 are also a logic low voltage level, the logic low voltage level applied at the third input of NOR gate 22 generates a logic high voltage level at the output of RS flip-flop 30 thereby turning on FET 50.

It is worth noting that the first and second inputs to NOR gate 22 will be a logic low voltage level if the voltage across resistor 58 is less than control voltage $V_{CTRL}$ and if there is substantially zero current flowing through transformer 52. Further, it is understood that under normal operation, the time that the output of RS latch 30 is in a logic low state is substantially less than the predetermined elapsed time.

In particular, when the voltage applied at the base of transistor 70 is a logic high voltage level, current flows through transistor 70 and resistor 74, and finally through transistor 72 whereit is subsequently mirrored through transistor 76 and pulled through current source 78. As a result, the voltage appearing at the collector of transistor 76 does not render transistor 82 operative. Thus, a logic low voltage level is supplied to the second terminal of resistor 84 (output of timer circuit 32).

On the other hand, when the voltage applied to the base of transistor 70 is a logic low voltage level, transistor 70 is rendered non-operative and supplies substantially zero current to transistor 72. Current source 78 supplies current through timing capacitor 80 and to the collector of transistor 72.

Further, the ratio of the emitter area of transistor 76 to the emitter area of transistor 72 is a predetermined ratio, for example, 10:1. Thus, for every unit of current that flows through timing capacitor 80 and transistor 72, approximately ten times that current flows through transistor 76.

If the logic low voltage level supplied at the base of transistor 70 exists for a predetermined length of time, the voltage across timing capacitor 80 increases to a predetermined voltage such that the voltage appearing at the collector of transistor 76 renders transistor 82 operative. As a result, a logic high voltage level is supplied to the second terminal of resistor 84.

In summary, timer circuit 32 monitors the time that the output of RS flip-flop 30 is in a logic low state such that when the time exceeds a predetermined length of time, a logic high voltage level is supplied to the output of timer circuit 32 and, subsequently, to the third input of NOR gate 28. Or equivalently, timer circuit 32 monitors the off-time of FET 50 such that when the off-time exceeds a predetermined length of time, timer circuit 32 initiates the turns on of FET50 and restarts the boost converter circuit.

By now it should be appreciated that there has been provided an improved power supply control integrated circuit having an internal timing circuit that monitors the off time of an external field-effect transistor while not requiring additional components.

While the invention has been described in conjunction with a specific application thereof, it is evident that many alterations, modifications and variations would be apparent to those skilled in the art in light of the foregoing description.

Accordingly, it is intended to embrace all such alterations, modifications and variations in the appended claims.

What is claimed is:

1. A power supply control integrated circuit, comprising:
   a first comparator having first and second inputs and an output, said first input being coupled to receive a first voltage signal, said second input being coupled to receive a first reference voltage;
   a second comparator having first and second inputs and an output, said first input of said second comparator being coupled to receive a second voltage signal, said second input of said second comparator being coupled to receive a second reference voltage;
   a flip-flop circuit having a plurality of inputs and an output, a portion of said plurality of inputs of said flip-flop circuit being responsive to said outputs of said first and second comparators, said output of said flip-flop circuit providing an output signal of the power supply control integrated circuit; and
   a timer circuit having an input and an output, said input of said timer circuit being coupled to said output of said flip-flop circuit, said output of said timer circuit being coupled to one of said plurality of inputs of said flip-flop circuit, said timer circuit applying a first logic state to said one of said plurality of inputs of said flip-flop circuit when said output of said flip-flop circuit has been in a second logic state for a predetermined length of time.

2. The power supply control integrated circuit according to claim 1 wherein said timer circuit includes:
   a first transistor having a collector, a base and an emitter, said collector being coupled to a first supply voltage terminal, and said base being coupled to said input of said timer circuit;
   a second transistor having a collector, a base and an emitter, said emitter of said second transistor being coupled to a second supply voltage terminal, and said base of said second transistor being coupled to said collector of said second transistor;
   a third transistor having a collector, a base and an emitter, said base of said third transistor being coupled to said base of said second transistor, and said emitter of said third transistor being coupled to said emitter of said second transistor;
   a fourth transistor having a collector, a base and an emitter, said collector of said fourth transistor being coupled to said first supply voltage terminal, and said base of said fourth transistor being coupled to said collector of said third transistor;
   a capacitor being coupled between said collectors of said second and third transistors;
   a first resistor being coupled between said emitter of said first transistor and said collector of said second transistor;
   a second resistor being coupled between said emitter of said fourth transistor and said output of said timer circuit; and
   a current source being coupled between said first supply voltage terminal and said collector of said third transistor.

3. The circuit according to claim 1 wherein said flip-flop circuit includes:
   a delay circuit having an input and an output, said input of said delay circuit being coupled to said output of said second comparator;
   a first NOR gate having first, second and third input and an output, said first input of said first NOR gate being coupled to said output of said delay circuit, and said third input of said first NOR gate being coupled to said output of said timer circuit; and
   a second NOR gate having first, second and third input and an output, said first input of said second NOR gate being coupled to said output of said first comparator, said second input of said second NOR gate being coupled to said output of said second comparator, said third input of said second NOR gate being coupled to said output of said first NOR gate, and said output of said second NOR gate being coupled to said second input of said first NOR gate and to said output of said flip-flop circuit.

4. In a boost converter circuit for converting an AC line signal to a DC output voltage including a transformer having primary and secondary coils, and a field-effect transistor having drain, gate and source electrodes, the drain of the field-effect transistor being coupled to receive a rectified version of the AC line voltage via the primary coil of the transformer, the boost converter circuit includes a power supply control integrated circuit comprising:
   a first comparator having first and second inputs and an output, said first input being coupled to the source electrode of the field-effect transistor, said second input being coupled to receive a first reference voltage;

a second comparator having first and second inputs and an output, said first input of said second comparator being responsive to a current flowing through the secondary coil of the transformer, said second input of said second comparator being coupled to receive a second reference voltage;

a flip-flop circuit having a plurality of inputs and an output, a portion of said plurality of inputs of said flip-flop circuit being responsive to said outputs of said first and second comparators, said output of said flip-flop circuit providing a drive signal to the gate electrode of the field-effect transistor; and a timer circuit having an input and an output, said input of said timer circuit being coupled to said output of said flip-flop circuit, said output of said timer circuit being coupled to one of said plurality of inputs of said flip-flop circuit, said timer circuit applying a first logic state to said one of said plurality of inputs of said flip-flop circuit when said output of said flip-flop circuit has been in a second logic state for a predetermined length of time.

5. The power supply control integrated circuit according to claim 4 wherein said timer circuit includes:

a first transistor having a collector, a base and an emitter, said collector being coupled to a first supply voltage terminal, and said base being coupled to said input of said timer circuit;

a second transistor having a collector, a base and an emitter, said emitter of said second transistor being coupled to a second supply voltage terminal, and said base of said second transistor being coupled to said collector of said second transistor;

a third transistor having a collector, a base and an emitter, said base of said third transistor being coupled to said base of said second transistor, and said emitter of said third transistor being coupled to said emitter of said second transistor;

a fourth transistor having a collector, a base and an emitter, said collector of said fourth transistor being coupled to said first supply voltage terminal, and said base of said fourth transistor being coupled to said collector of said third transistor;

a capacitor being coupled between said collectors of said second and third transistors;

a first resistor being coupled between said emitter of said first transistor and said collector of said second transistor;

a second resistor being coupled between said emitter of said fourth transistor and said output of said timer circuit; and a current source being coupled between said first supply voltage terminal and said collector of said third transistor.

6. The power supply control integrated circuit according to claim 5 wherein said flip-flop circuit includes:

a delay circuit having an input and an output, said input of said delay circuit being coupled to said output of said second comparator;

a first NOR gate having first, second and third input and an output, said first input of said first NOR gate being coupled to said output of said delay circuit, and said third input of said first NOR gate being coupled to said output of said timer circuit; and a second NOR gate having first, second and third input and an output, said first input of said second NOR gate being coupled to said output of said first comparator, said second input of said second NOR gate being coupled to said output of said second comparator, said third input of said second NOR gate being coupled to said output of said first NOR gate, and said output of said second NOR gate being coupled to said second input of said first NOR gate and to said output of said flip-flop circuit.

7. The power supply control integrated circuit according to claim 6 further includes a driver circuit coupled between the output of said flip-flop circuit and the gate electrode of the field-effect transistor.

8. A method for starting the operation of a control circuit including a flip-flop circuit having a plurality of inputs and an output, the method comprising the steps of:

(a) monitoring the logic state of the output of the flip-flop circuit;

(b) providing a signal of a first logic state to one of the plurality of inputs of the flip-flop circuit when the output signal of the flip-flop circuit has been in a second logic state for a predetermined length of time; and (c) forcing the output signal of the flip-flop circuit to said first logic state.

* * * * *